(12) United States Patent
Berard et al.

(10) Patent No.: US 7,550,516 B2
(45) Date of Patent: Jun. 23, 2009

(54) METHOD FOR EXTRACTING NYLON FROM WASTE MATERIALS

(75) Inventors: Raymond A. Berard, Portsmouth, RI (US); Donald Lees, White, GA (US); Joel Sheppard, LaGrange, GA (US); Gabe Moore, Acworth, GA (US)

(73) Assignee: Interface, Inc., Atlanta, GA (US)

( * ) Notice: Subject to any disclaimer, the term of this patent is extended or adjusted under 35 U.S.C. 154(b) by 483 days.

(21) Appl. No.: 11/198,063

(22) Filed: Aug. 5, 2005

(65) Prior Publication Data

US 2006/0031997 A1 Feb. 16, 2006

Related U.S. Application Data

(63) Continuation-in-part of application No. 09/852,855, filed on May 10, 2001.

(60) Provisional application No. 60/599,624, filed on Aug. 5, 2004.

(51) Int. Cl.
C08J 11/08 (2006.01)
(52) U.S. Cl. .......................... 521/40; 528/495
(58) Field of Classification Search ................... 521/44, 521/49.8, 40; 528/495
See application file for complete search history.

(56) References Cited

U.S. PATENT DOCUMENTS

| | | | |
|---|---|---|---|
| 2,742,440 A | 4/1956 | Scott et al. | |
| 3,696,058 A | 10/1972 | Teti et al. | |
| 4,028,159 A | 6/1977 | Norris | |
| 4,146,704 A | 3/1979 | Seki et al. | |
| 4,334,056 A | 6/1982 | Meyer et al. | |
| 4,335,562 A | 6/1982 | Meyers et al. | |
| 5,169,870 A | 12/1992 | Corbin et al. | |
| 5,230,473 A | 7/1993 | Hagguist et al. | |
| 5,411,710 A | 5/1995 | Iwasyk | |
| 5,430,068 A | 7/1995 | Subramanian | |
| 5,457,197 A | 10/1995 | Sifniades et al. | |
| 5,497,949 A | 3/1996 | Sharer | |
| 5,518,188 A | 5/1996 | Sharer | |
| 5,535,945 A | 7/1996 | Sferrazza et al. | |
| 5,656,757 A | 8/1997 | Jenczewski et al. | |
| 5,681,952 A | 10/1997 | Sifniades et al. | |
| 5,840,773 A | 11/1998 | Booij et al. | |
| 5,889,142 A | 3/1999 | Mohajer et al. | |
| 5,898,063 A | 4/1999 | Stefandl | |
| 5,929,234 A | 7/1999 | Sifniades et al. | |
| 5,932,724 A | 8/1999 | Sifniades et al. | |
| 6,029,916 A | 2/2000 | White | |
| 6,036,726 A | 3/2000 | Yang et al. | |
| 6,126,096 A | 10/2000 | Robinson et al. | |
| 6,211,275 B1 | 4/2001 | Xanthos et al. | |
| 6,214,908 B1 | 4/2001 | Lem et al. | |
| 6,228,479 B1 | 5/2001 | Zegler et al. | |
| 6,342,555 B2 | 1/2002 | Sifniades et al. | |
| 6,398,138 B1 | 6/2002 | Robinson et al. | |
| 6,752,336 B1 | 6/2004 | Wingard | |
| 7,319,113 B2* | 1/2008 | Mckinnon | 521/49.8 |
| 2002/0037939 A1 | 3/2002 | McKinnon | |

FOREIGN PATENT DOCUMENTS

| | | |
|---|---|---|
| CA | 788009 | 6/1968 |
| EP | 0759456 A1 | 2/1997 |
| EP | 0984087 A1 | 3/2000 |
| WO | WO 02/3668 A1 | 5/2002 |
| WO | WO 02/36668 A1 | 5/2002 |

OTHER PUBLICATIONS

Mihunt, Captain, Gadala-Maria, and Amirids, "Review: Recycling of Nylon from Carpet Waste," Polymer Engineering and Science, Sep. 2001, vol. 41, No. 9, pp. 1457-1470.

International Search Report issued in PCT Patent Application No. PCT/US2005/028006 dated Nov. 21, 2005.

United States Patent and Trademark Office, Office Action, U.S. Appl. No. 09/852,855, mailed Dec. 6, 2002.

United States Patent and Trademark Office, Response under 37 C.F.R. 1.111, received Mar. 24, 2003.

United States Patent and Trademark Office, Office Action, U.S. Appl. No. 09/852,855, mailed Jun. 4, 2003.

United States Patent and Trademark Office, Amendment and Response to Office Action, U.S. Appl. No. 09/852,855, received Dec. 5, 2003.

United States Patent and Trademark Office, Office Action, U.S. Appl. No. 09/852,855, mailed Dec. 31, 2003.

United States Patent and Trademark Office, Amendment and Response, received Mar. 26, 2004.

(Continued)

Primary Examiner—Tae H Yoon
(74) Attorney, Agent, or Firm—Kilpatrick Stockton LLP

(57) ABSTRACT

The invention relates to a method for recovering nylon from a nylon-containing material by contacting the nylon-containing material with an alkanol-containing solvent at elevated temperature and at a pressure higher than the equilibrium pressure of the alkanol-containing solvent at the elevated temperature, thereby dissolving the nylon in the alkanol-containing solvent, removing the alkanol-containing solvent containing dissolved nylon from any undissolved solids, and decreasing the temperature of the alkanol-containing solvent containing dissolved nylon to precipitate the dissolved nylon.

31 Claims, 6 Drawing Sheets

OTHER PUBLICATIONS

United States Patent and Trademark Office, Office Action, U.S. Appl. No. 09/852,855, mailed Apr. 12, 2004.
United States Patent and Trademark Office, Request for Continued Examination (RCE) Transmittal, received May 10, 2004.
United States Patent and Trademark Office, Office Action, U.S. Appl. No. 09/852,855, mailed Jul. 15, 2004.
United States Patent and Trademark Office, Response to Office Action, received Jan. 18, 2005.
United States Patent and Trademark Office, Office Action, U.S. Appl. No. 09/852,855, mailed Apr. 7, 2005.
United States Patent and Trademark Office, Appeal Brief, received Jan. 13, 2006.
United States Patent and Trademark Office, Office Action, U.S. Appl. No. 09/852,855, Apr. 5, 2006.
United States Patent and Trademark Office, Terminal Disclaimer and Amendment and Response, received Jul. 3, 2006.
United States Patent and Trademark Office, Office Action, U.S. Appl. No. 09/852,855, mailed Aug. 28, 2008.
United States Patent and Trademark Office, Amendment and Response to Office Action, received Dec. 4, 2006.
United States Patent and Trademark Office, Office Action, U.S. Appl. No. 09/852,855, mailed Dec. 21, 2006.
United States Patent and Trademark Office, Appeal Brief, received Dec. 28, 2006.
United States Patent and Trademark Office, Examiner's Answer U.S. Appl. No. 09/852,855, mailed Mar. 20, 2007.
United States Patent and Trademark Office, Amendment and Response pursuant to 37 CFR 1.114, received May 21, 2007.
United States Patent and Trademark Office, Office Action, U.S. Appl. No. 09/852,855, mailed Jul. 12, 2007.
United States Patent and Trademark Office, Amendment and Response pursuant to 37 CFR 1.11, dated Jan. 14, 2008.
United States Patent and Trademark Office, Office Action, U.S. Appl. No. 09/852,855, mailed Mar. 26, 2008.
United States Patent and Trademark Office, Request for Continued Examination (RCE) Transmittal, received May 21, 2007.

* cited by examiner

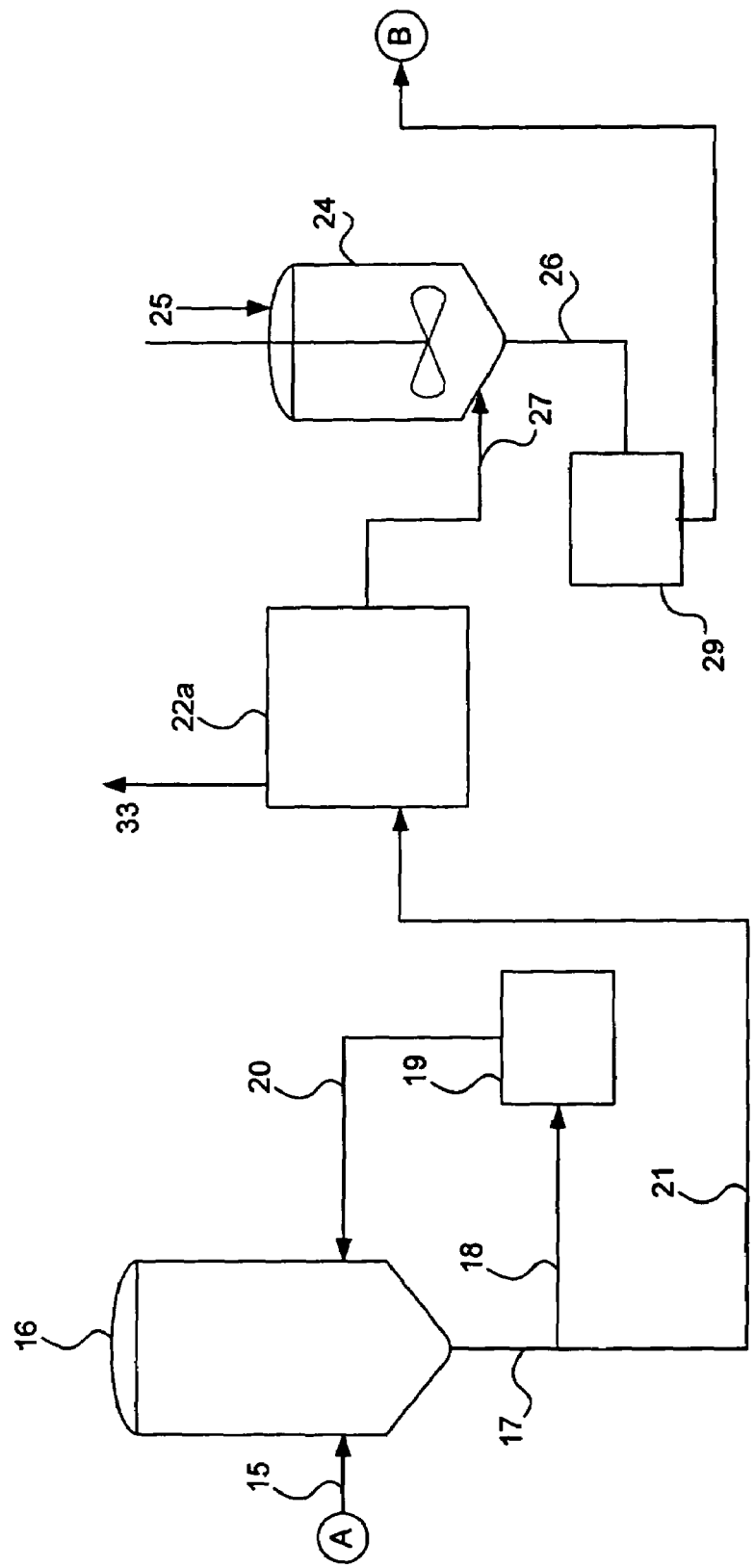

METHOD FOR EXTRACTING NYLON FROM WASTE MATERIALS

This application claims benefit of the filing date of provisional application Ser. No. 60/599,624, filed Aug. 5, 2004, and is a continuation-in-part of Ser. No. 09/852,855, filed May 10, 2001.

BACKGROUND OF THE INVENTION

1. Field of the Invention

The present invention relates to improved processes for extracting nylon from waste materials, including mixed waste materials such as floor coverings, such that degradation of the nylon polymer into lower molecular weight polymers, oligomers, and monomers is decreased. The process involves contacting the waste materials with polar solvents, or mixtures thereof at high pressures.

2. Description of Related Art

Nylon is widely used as a fiber, both in the production of textile cloths, and in the production of floor covering materials, such as broadloom carpet and carpet tile. When used in floor covering materials, the nylon is usually predominantly present as part of one or more layers of a multilayered product. Large quantities of floor covering materials are replaced each year, with the resulting used materials often discarded to landfills. Because of environmental and economic concerns about this waste material, there has been a need for an economical process for recovering and reusing used or discarded floor covering materials. However, because these materials often contain complicated composites or laminates that are difficult to separate into their constituent components, recycling processes for these materials too often result in conglomerated products whose value is considerably lower than that of their individual constituents. In some cases, the value of the product of recycling may be equal to or less than the value of the original starting material. Downcycling of this nature is both environmentally and economically wasteful. Because the downcycled product is not as valuable as the original starting material, or even of the original inputs to the production of the original waste material, economic value is lost. Because the downcycled product does not make the best use of its constituents, additional constituent materials must be produced and used, generating an additional environmental burden made particularly heavy because these constituent materials are often based on petrochemicals.

As a result of these considerations, there is a need in the art for processes that can economically separate and recycle one or more of the components of floor covering materials. In particular, there is a need in the art for processes that allow for the separation and recovery of nylon used in floor covering materials, and in particular, of nylon used in the topcloth or facecloth layers of these floor covering materials, in such a way that the value and usefulness of the nylon is not degraded.

Processes for recovering nylon tend to fall into two distinct categories. In one category are processes where the nylon is deliberately depolymerized into monomer or oligomers thereof, which can then be reused by repolymerization. In general, the goal is to reduce as much of the polymer to monomer as possible, in order to make reuse more predictable. However, processes in this category are disadvantageous because depolymerization is expensive, and can lead to side reactions that decrease the amount of monomer available, reducing efficiency, and requiring additional depolymerization and energy consumption to make up for the loss. In addition, depolymerization of nylon 6,6 through aminolysis results in production of hexamethylenediamine (HDMA), but requires an additional source of adipic acid to obtain nylon 6,6, since adipic acid is not economically recovered from the depolymerization process.

In the other category are processes where the nylon is recovered without depolymerization, so that it can be reused without repolymerization. In general, the goal of such processes is to extract or dissolve the nylon and thus separate it from other components of the floor covering material with minimal polymer breakdown. The nylon is then generally obtained in solid form so that it can be reused. Conventional dissolution or extraction type processes can be difficult, if not impossible, to use without downcycling the value of the nylon. At least part of the reason for this is that some polymer breakdown almost always occurs due to the elevated temperatures necessary to facilitate dissolution or extraction on an economically relevant time scale.

For example, nylon fiber that is to be subjected to a dissolution or extraction type recovery process will have had its molecular weight reduced by the original extrusion process to produce the fiber, due to the high temperatures involved. Molecular weight will be reduced further during the conventional extraction or dissolution process, and as noted before will be even further reduced if the nylon is to be re-extruded back into fiber. This cumulative breakdown will render the molecular weight of the nylon inappropriate for reuse as fibers suitable for flooring applications.

Another disadvantage of both types of nylon recycling processes is that they either use a feedstock with a higher content of non-nylon scrap than is desirable for the process, or they go to great lengths to obtain relatively pure or color-free nylon feedstocks. In the case of composite products, such as floor coverings like carpet and carpet tile, the presence of fillers, backing materials, pigments, adhesives, etc. can complicate the nylon recycling effort, requiring that these materials be physically and/or chemically separated from the nylon prior to any nylon fiber-specific processing.

There is therefore a need in the art for a nylon recycling process that does not require depolymerization, that does not significantly degrade the molecular weight of the nylon polymer recovered, and that is useful to prepare nylon suitable for extrusion into fiber using as a feedstock nylon that has previously been extruded into fiber, and in particular, nylon that has been obtained from floor covering material, without the need to excessively physically separate other components from the feedstock, e.g., by using procedures beyond air elutriation.

SUMMARY OF THE INVENTION

In one embodiment, the invention relates to a process that fulfills this need. Nylon, which may be obtained in the form of waste material, such as waste or scrap floor covering material (obtained, e.g., from used carpet, carpet tile, or other floor covering, or as selvedge produced in the manufacture of carpet or carpet tile), is contacted with a solvent or solvent mixture containing an alcohol at an elevated temperature, and at an elevated pressure. The use of an elevated pressure has been found to unexpectedly decrease the temperature and dissolution time at which the nylon in the waste material will effectively dissolve in the solvent mixture. At least in part as the result of this decrease in dissolution temperature, the nylon can be dissolved with a substantially decreased degradation of its molecular weight. This preservation of molecular weight allows the process to be effectively used with nylon that has been extruded into fiber, such as that found in floor coverings, and produces nylon that can again be extruded into fiber, for use in floor coverings. In effect, the process of the invention allows the nylon present in floor coverings to be recycled without being downcycled. Although the process can be used with nylon that has been separated from other composite material components, this need not occur with commonly used floor covering materials.

The invention can be viewed as a method for recovering nylon, including:

contacting the nylon with an alkanol-containing solvent at elevated temperature and at a pressure higher than the equilibrium pressure of the alkanol-containing solvent at the elevated temperature;

removing alkanol-containing solvent containing dissolved nylon from any undissolved solids;

decreasing the temperature and pressure of the alkanol-containing solvent containing dissolved nylon to precipitate the dissolved nylon. The recovered nylon can then be further processed by filtration, washing, etc., and reused.

The increase in pressure of the nylon and alkanol-containing solvent mixture can be accomplished by introducing inert gas into the dissolution vessel or conduit, which is desirably a pressure-rated vessel or a plug flow heat exchanger. Alternatively, the increase in pressure of the solvent mixture can be accomplished by increasing the head pressure of the solvent mixture pumped into the reactor. For instance, the vessel through which solvent is introduced to the reactor could have a cross-sectional area that exceeds that of the vessel through which solvent is withdrawn from the reactor, creating a pressure head in the reactor sufficient to lower the nylon dissolution temperature, and thus the reactor temperature, as described herein.

The method of the invention is suitable for recovering nylon from waste materials, and is particularly suitable for use with nylon-containing floor covering waste materials, such as used or scrap carpet or carpet tile, or selvedge obtained during production of these materials. In particular, use of the method with carpet tile has been found to be very beneficial, since these materials are typically composite structures having a number of laminated layers. The method of the invention provides the additional benefit of making separation of these laminated layers easier, and in many cases the waste materials emerge from the dissolution process with the nylon removed and the remaining layers of materials already separated. This confers apparent advantages in making the recycling of these additional components much more efficient.

In addition, it has been found that the processing of nylon in contact with solvents requires careful handling in order to make the recycling process economically viable, particularly since much of the process is conducted at relatively high temperature and pressure. This recognition has not been disclosed in the prior art. For example, any heating of the mixture of nylon fibers and solvent mixture to dissolution temperature must be carried out under conditions and using process equipment that avoids or reduces the tendency for the fibers or particles to collect and settle, clogging the process equipment and piping. The invention includes embodiments where this clogging is minimized or avoided, allowing the process to be accomplished in a more efficient manner.

One of the process features that helps to provide reduced clogging is a high velocity, high recycle ratio partial recycle of solvent and nylon particles or fibers leaving the mixer, prior to heating the mixture to dissolution temperature. The high velocity can be maintained, e.g., by an auger pump modified so that its intake is in the pump throat. The recycle stream keeps a constantly circulating, high velocity stream moving through the mixer outlet, the lines to the pump, and the pump itself. This flow is desirably agitated plug flow, and maintaining this type of flow prevents or minimizes agglomeration and clogging of the process equipment.

Another process feature that helps to reduce clogging is the use of a plug flow heat exchanger to heat the solvent/nylon mixture to dissolution temperature. This avoids the use of shell-and-tube heat exchangers or other heat exchanger designs where sharp bends, heads or manifolds, constrictions, and other elements provide opportunities for nylon particles to settle and clog the equipment. Examples of plug flow heat exchangers include coiled tube exchangers, stacked tube exchangers, jacketed plug flow reactors, plate and frame exchangers, and other designs that allow turbulent flow of the process mixture.

Another process feature that increases the efficiency of the nylon recovery process is the use of high efficiency filtration systems to concentrate the nylon precipitated from solution. Examples include membrane filtration, ultrafiltration, reverse osmosis, and similar high efficiency separation techniques. One example of such a process is vibratory shear enhanced processing membrane filtration ("VSEP"). Another example is a filter press. Both techniques can substantially increase the solids content of the process stream, making subsequent drier operation more efficient without sacrificing product (i.e., without significant product loss).

In one embodiment, the invention relates to a method for recovering nylon from a nylon-containing material, by:

contacting the nylon-containing material with an alkanol-containing solvent in a mixing vessel, wherein at least a portion of the mixture of nylon-containing material and alkanol-containing solvent is withdrawn from the mixing vessel and returned to the mixing vessel at a high flow rate;

increasing the temperature and pressure of the mixture until a pressure is reached that is higher than the equilibrium pressure of the alkanol-containing solvent at the increased temperature, thereby dissolving the nylon in the alkanol-containing solvent;

removing the alkanol-containing solvent containing dissolved nylon from any undissolved solids; and decreasing the temperature, or pressure, or both, of the alkanol-containing solvent containing dissolved nylon to precipitate the dissolved nylon.

In another embodiment, the invention relates to a method for increasing the tenacity of nylon fiber, by:

dissolving a feedstock nylon fiber in a solvent comprising an alkanol at elevated temperature and at a dissolution pressure above the equilibrium vapor pressure of the solvent at the dissolution temperature;

filtering undissolved solids from the solution;

precipitating nylon from solution by decreasing pressure, temperature, or both of the solution, to form a precipitated mixture;

concentrating the precipitated nylon by removing solvent from the precipitated mixture to form a concentrated mixture;

drying the concentrated mixture to form solid nylon;

extruding the solid nylon into fiber having tenacity increased over that of the feedstock nylon fiber.

In another embodiment, the invention relates to a method for increasing the molecular weight of feedstock nylon, by:

dissolving a feedstock nylon in a solvent comprising an alkanol at elevated temperature and at a dissolution pressure above the equilibrium vapor pressure of the solvent at the dissolution temperature;

filtering undissolved solids from the solution;

precipitating nylon from solution by decreasing pressure, temperature, or both of the solution, to form a precipitated mixture;

concentrating the precipitated nylon by removing solvent from the precipitated mixture to form a concentrated mixture;

drying the concentrated mixture to form solid nylon having a molecular weight substantially increased over that of the feedstock nylon.

In another embodiment, the invention relates to an apparatus for recovering nylon from a nylon-containing material, including:

a mixing vessel adapted to mix nylon containing materials with a liquid solvent;

a high flow rate splitting pumping system in fluid communication with the mixing vessel, adapted to withdraw a portion of the contents of the mixing vessel and return it to the mixing vessel at a high flow rate;

a pressurized heat exchanger in fluid communication with the mixing vessel, the splitting pump, or both, adapted to heat a mixture of nylon and solvent from the mixing vessel to an elevated temperature at a pressure above the equilibrium vapor pressure of the solvent;

a filtration system in fluid communication with the pressurized heat exchanger, adapted to remove undissolved solids from a fluid stream;

a precipitator in fluid communication with the filtration system, the pressurized heat exchanger, or both, adapted to reduce the pressure of a fluid stream, decrease the temperature of a fluid stream, or both;

a concentrator in fluid communication with the precipitator, adapted to remove solvent from, and increase the solids content of, a mixture of precipitated nylon and solvent;

a drier in fluid communication with the concentrator, adapted to dry a concentrated mixture of nylon and solvent. The pumping system typically comprises two pumps: a high flow rate recirculating pump, and a second pump adapted to withdraw a portion of the flow and feed it to a heat exchanger while increasing its pressure. The high flow rate recirculating pump is typically in fluid communication with the mixing vessel outlet (on the recirculating pump inlet side) and the second pump (on the recirculating pump outlet side). The second pump is typically in fluid communication with the high flow rate recirculating pump (on the second pump inlet side) and the heat exchanger and mixing vessel recycle inlet (on the second pump outlet side).

In another embodiment, the invention relates to a type of pump suitable for the second pump in the splitting pumping system having:

a progressive cavity, including:

a distal end;

a proximal end;

a progressive cavity rotor extending through at least a portion of the progressive cavity;

a progressive cavity stator surrounding the progressive cavity rotor and disposed between the distal and proximal ends of the progressive cavity;

an inlet chamber in fluid communication with the proximal end of the progressive cavity;

a lateral inlet opening in fluid communication with the inlet chamber;

a lateral recycle outlet opening in fluid communication with the inlet chamber;

a process stream outlet in fluid communication with the distal end of the progressive cavity; and a drive shaft linked to the progressive cavity rotor.

The process of the invention results in a significant advantage because the nylon obtained has a higher molecular weight than the feedstock nylon. Whether this is the result of retention of lower molecular weight nylon fragments in solution or the result of the formation of nylon chain lengthening or cross linkage during the process is unclear. What is clear is that the higher molecular weight nylon has high tenacity when extruded into fiber, making the material produced by the process quite suitable for reuse as fiber. As a result, the process of the invention recycles nylon without downcycling it, and provides a sustainable method for reusing the nylon used in carpet fiber.

BRIEF DESCRIPTION OF THE DRAWINGS

FIG. 1(C) is a continuation of the process schematic diagram of FIG. 1(A) according to another embodiment of the invention.

FIG. 2 shows one embodiment of a splitter pump according to the invention.

DETAILED DESCRIPTION OF SPECIFIC EMBODIMENTS OF THE INVENTION

Figure 1A:
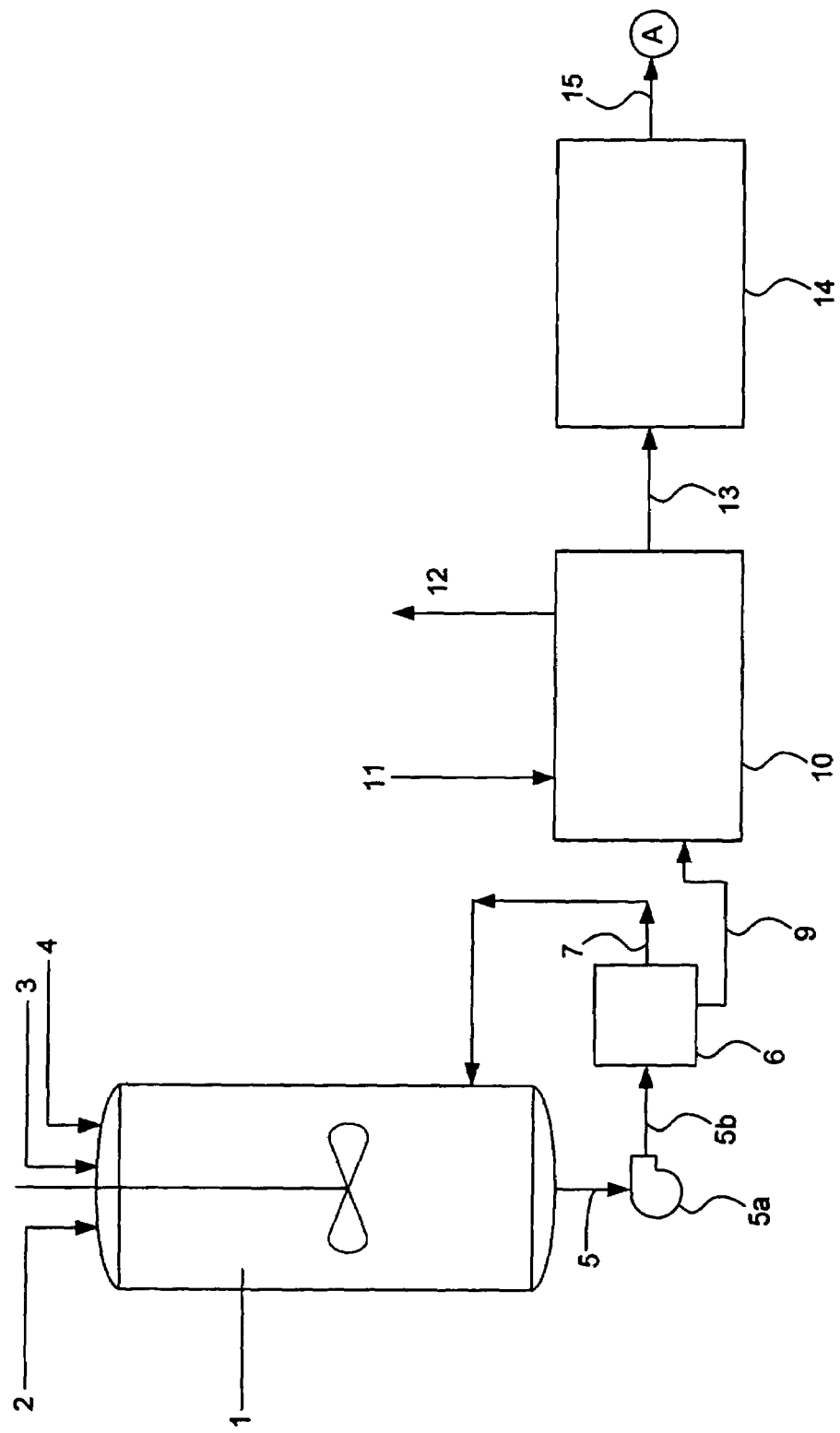
FIG. 1(A) is a process schematic diagram for one embodiment of the process of the invention.

In overview, the process of the invention invention involves the use of a solvent or mixture of solvents, containing a lower alkanol, to dissolve nylon at a pressure above the equilibrium pressure of the solvent at the dissolution temperature. The nylon is desirably in the form of nylon 6,6, but may include other nylons or combinations thereof. The nylon, which may be ground, comminuted, chopped or otherwise modified in size, may be added as waste or scrap floor covering material, such as carpet or carpet tile, or as some other composite material, or as essentially pure nylon, is contacted with the solvent or solvent mixture in a dissolution vessel or conduit. In order to achieve and maintain dissolution without clogging of process lines, a high flow rate recycle of the fiber/solvent slurry is used during the mixing step. A high pressure pump can be used to increase the pressure of the process stream above that of the equilibrium vapor pressure of the solvent. After heating/dissolution in a dissolution vessel or conduit, such as a plug flow heat exchanger, the nylon/solvent solution is recrystallized or precipitated and dried using a high efficiency drying process, which may be preceded by a process to increase the solids content of the process stream, such as a VSEP, a filter press, or a combination of these. The drying process may include spin flash driers, tray driers, horizontal plow dryers, Bry-Air dryers, and/or other drying apparatus, all of which can be operated under in an inert gas environment or under sufficient vacuum to maintain a relatively oxygen-free environment. The resulting recrystallized nylon has a very high molecular weight, extremely good tenacity, and is generally quite suitable for spinning into fibers; the process thus represents a sustainable means for recycling nylon fiber from carpet waste without downcycling the fiber.

In a particular embodiment a carpet product feedstock, consisting of primary carpet backing tufted with nylon 6,6 fiber, was sheared using rotating cylindrical shear blades, which cut the fibers to consistent length. A vacuum system disposed above the shear blades pulls the sheared nylon fibers away from the backing; the fibers are captured by the vacuum system and bagged, pressed, and baled.

The dissolution vessel is maintained at a pressure higher than the equilibrium pressure for the solvent system at the selected temperature. For example, at a temperature of about 150° C., the equilibrium pressure of an ethanol/water solvent system will be approximately 100 psig. The pressure in the vessel can be increased by an amount ranging from about 300 psig to about 600 psig, more particularly from about 300 psig to about 500 psig, even more particularly from about 400 psig to about 500 psig. One technique for increasing the pressure is to increasing the head pressure of the solvent system entering the vessel. This can be done, e.g., by removing liquid from the vessel through a conduit having a smaller cross-sectional area than the conduit delivering solvent to the reactor, or by using a high pressure pump to drive the process stream through a pressure control valve or an orifice plate, by adding inert gas, such as $N_2$, to the dissolution vessel or conduit prior to or during dissolution. Alternatively, the pressure in the vessel can be increased by introducing a sufficient quantity of inert gas, such as nitrogen, argon, etc. into the dissolution vessel.

The dissolution vessel is heated to a dissolution temperature of about 130° C. to about 155° C., more particularly from about 135° C. to about 145° C., even more particularly from about 140° C. to about 145° C., and held at this temperature for a period of time sufficient to dissolve the desired yield of nylon. Surprisingly, the use of increased pressure allows operation at temperatures below 160° C.

This increased pressure importantly allows increased and faster dissolution of the nylon into the solvent system as compared to the dissolution level and rate at the equilibrium pressure for that temperature. Put another way, for the same dissolution level, the invention allows the process to be operated at a lower temperature than would an equilibrium pressure process, or even a slightly elevated (e.g., 50 psig) pressure process. Degradation of the nylon is thus decreased, resulting in a higher quality product that is suitable for extrusion into fiber. More particularly, the process of the invention results in a nylon product that is enriched in high molecular weight nylon, as compared to conventional processes that are not carried out at increased pressure.

Suitable solvents and solvent mixtures include lower alkanols, mixtures thereof, and mixtures of lower alkanols with water. More particularly, suitable lower alkanols include methanol, ethanol, propanols, butanols, and mixtures thereof. Mixtures of methanol and water or ethanol and water have been found to be particularly suitable. In particular, mixtures of ethanol and water are desirable because of the decreased environmental and regulatory concerns associated with using ethanol as compared to using other alkanols. When mixed with water, the alkanols are generally used in proportions ranging from about 40% to about 90% of alkanol:water. In particular, a 80% mixture of ethanol and water has been found to be suitable for most applications. Desirably, the solvent or solvent mixture is substantially free (i.e., does not contain more than about 1%) of glycols or other polyols. Water has been found to make the process more economical, and is believed to decrease the dissolution time of some alkanol solvents.

After dissolution of, e.g., carpet scrap, in the dissolution vessel or dissolution conduit, such as a plug flow heat exchanger, the mixture is removed from the dissolution vessel. The hot solution is filtered to remove the undissolved components, and the solution is cooled at atmospheric pressure to about 120° C. to about 130° C. to recrystallize or precipitate out the dissolved nylon. The nylon is filtered from the remaining solution, leaving in solution any oils, lubricants, and plasticizers, coating materials, and other impurities. As the nylon/solvent solution is cooled, high molecular weight nylon will precipitate first, and can therefore be filtered from the solution while maintaining the temperature of the solution between about 120° C. and about 130° C. This allows the low molecular weight materials, resulting from the previous extrusion or what little degradation in molecular weight does occur, to remain in solution and excluded from the nylon product. While the solution also retains some soluble components that may be present in floor covering materials, such as plasticizers, lubricants, and coating materials, the solvent mixture can be recovered by evaporation and/or distillation. The precipitated nylon can then be washed with a clean, hot alkanol/water mixture and dried, e.g., in a vacuum oven.

It has been found that the use of increased pressure allows the use of dissolution or extraction temperatures below 160° C., while maintaining the relative viscosity (an indicator of molecular weight) of the nylon at a level acceptable for use in fiber extrusion. While not wishing to be bound by any theory, it is believed that this effect results at least in part from better or more complete dissolution of low molecular weight nylon fractions, which then remain in solution as the higher molecular weight nylon fractions precipitate out.

In addition, it has been found that dissolution can be enhanced by separating the mixing and heating process steps, performing these functions in separate process equipment, and recycling a stream of the solvent/nylon mixture, which mainly includes solvent and undissolved solids, both of nylon and of other materials. This recycle stream is pumped at a relatively high velocity from the mixing vessel, through a pump, and back into the mixing vessel. The velocity of the mixture is sufficient to provide plug flow through the recycle loop, desirably turbulent plug flow. A process stream is separated from the recycled material for further processing; recycling the material in the mixing tank in this way keeps the nylon particles and fibers from settling and clogging the pumping system, tank exits, and piping. The recycle ratio (the ratio of volume recycled to total volume) is not particularly critical, but can typically range between about 0.971 and 0.981.

Figure 1B:
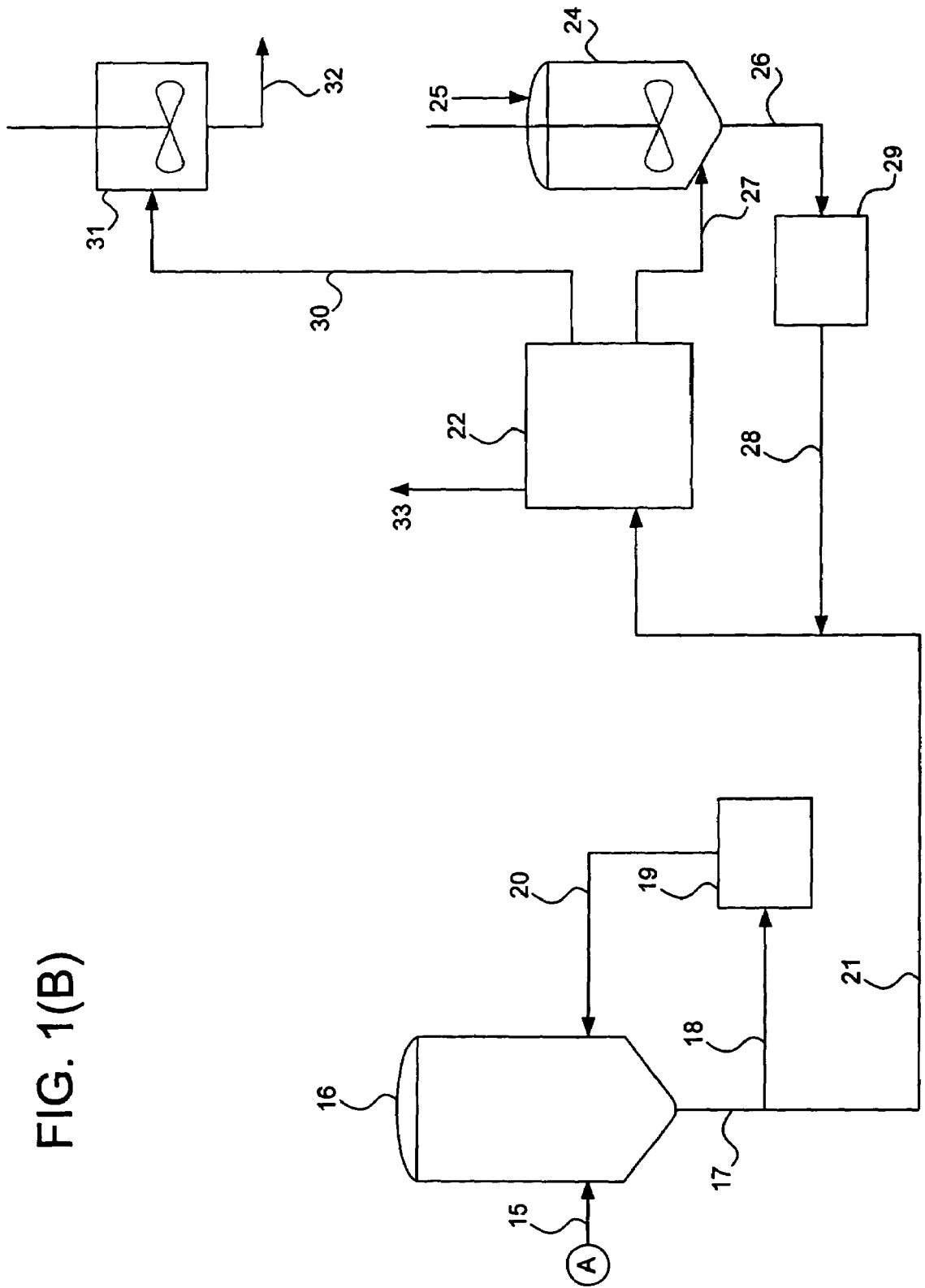
FIG. 1(B) is a continuation of the process schematic diagram of FIG. 1(A) according to one embodiment of the invention.

This embodiment of the process can be more clearly understood with reference to FIGS. 1(A), 1(B), and 1(C), which provide schematic views of two embodiments of the process of the invention. In both embodiments, in mixer 1 is mixed nylon-containing feedstock 2, solvent 3, and inert gas feed 4. The solvent 3 and nylon-containing feedstock 2 are mixed under pressure, and a portion of this mixture is removed as mixture effluent stream 5 by pump 5*a*. The effluent stream 5*b* from pump 5*a* is introduced into a splitting pump 6, which separates the stream into a high flow rate recycle stream 7, which is returned to the mixer 1, and a lower flow rate process stream 9, which is pumped by splitting pump 6 to heat exchange system 10. Recycle stream 7 is processed at relatively high linear velocity; stream 9 is separated from stream 7, typically at a significantly lower flow rate. Both are pumped through pipes or tubes that have relatively smooth internal surfaces, such as swage fitted pipe, in order to achieve agitated plug flow and decrease the opportunity for the nylon fibers or particles in the stream to settle and clog the process equipment.

Process stream 9 passes through heat exchange system 10, where it is heated by a working fluid introduced through inlet stream 11 (desirably steam) and exhausted through outlet stream 12 (desirably condensate). Heated mixture 13 leaves the heat exchange system 10 with at least a part (desirably most) of the nylon of process stream 9 dissolved in solvent 3. Heated mixture 13 may also contain particles of undissolved materials, such as carpet backing, plasticizer, reinforcing fiber, filler and the like. These particulate materials can be filtered out of the solution by strainer/filtration system 14, so that filtered stream 15 is primarily dissolved nylon and solvent. In addition, to help reduce the amount of undissolved materials flowing through system 15, ground and/or elutriated carpet waste can be thoroughly rinsed in water or other rinsing liquid to remove as much particulate material as possible prior to introduction into the mixer.

Filtered stream 15 is then fed to a precipitator, where the dissolved nylon is precipitated from solution. Because the solution is at relatively high pressure, a flash precipitator, which removes nylon from solution by decreasing the pressure of the solution, can be advantageously used if cooling operations for precipitation are undesirable. The resulting suspension of precipitated nylon and solvent can be removed from the precipitator as effluent stream 17, and optionally a portion of this stream 18, 20 can be recycled to the precipitator by pump 19 to agitate the slurry and avoid settling of the nylon product.

Figure 1D:
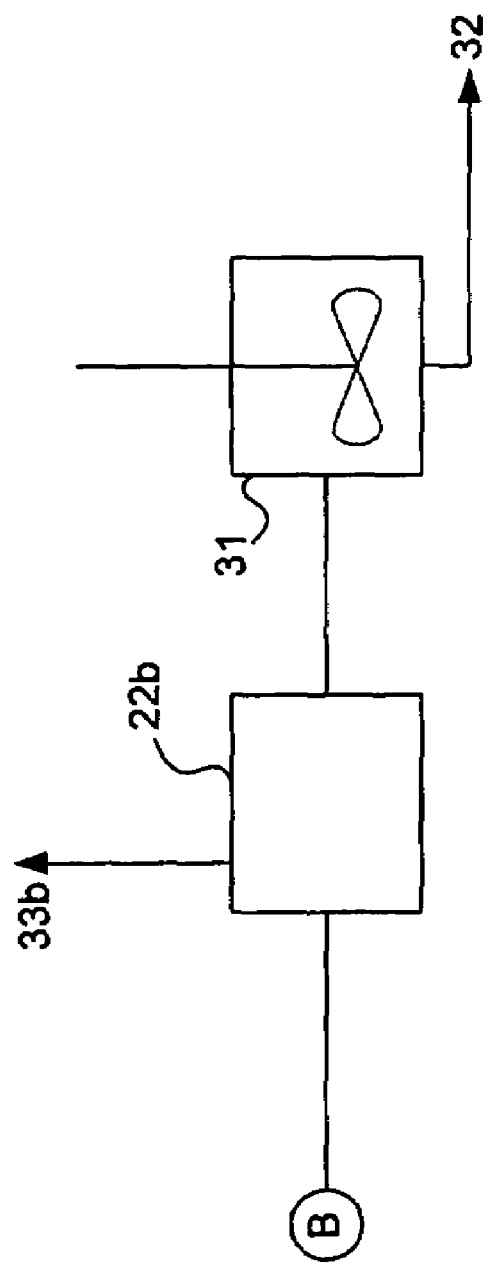
FIG. 1(D) is a continuation of the process schematic diagram of FIG. 1(C).

The non-recycled portion of the precipitated effluent suspension 21 is passed to a filtration system 22, where it is concentrated, and solvent permeate stream 33 is removed. The unwashed concentrate stream 27 is fed to wash tank 24, where it is washed with wash liquid 25, typically a mixture of water and solvent similar to that used in the mixer. In the embodiment of the invention shown schematically in FIG. 1(B), washer effluent stream 26, 28 is recycled to filtration system 22 by wash tank recycle pump 29. Filtration system 22 reconcentrates the washed stream, and the reconcentrated washed stream is then fed to dryer 31, where residual solvent and water is removed. In the embodiment of the invention schematically illustrated in FIG. 1(C), unwashed concentrate stream 27 is fed to another filtration system 22a, which may be of the same or different type as filtration system 22, where it is reconcentrated and permeate stream 33a is removed. Washed, concentrated, and dried product 32 is removed from dryer 31, shown in FIG. 1(D) for this embodiment of the invention. Those of skill in the art will recognize that it may be necessary or desirable to include further washing and/or reconcentrating steps prior to drying, in order to remove as much undesired contaminants, solvent, water, etc., as possible.

The solid nylon resulting from the process has a sufficiently high molecular weight that it is suitable for higher valued uses, such as fiber spinning, as well as for lower valued uses, such as injection molding. In addition, it has been found that, surprisingly, nylon produced by this process can be processed into nylon fiber having tenacities that are considerably higher than those obtainable using virgin nylon, and that the tenacity increases as the proportion of recycled nylon in the fiber increases where mixtures with virgin material are used.

The mixer 1 can be a pressure rated vessel operated as a stirred tank, with inlets for nylon-containing scrap material 2, solvent 3, and inert gas 4, such as nitrogen, to blanket the tank. The tank will also be outfitted with a pass-through or other access for a motorized stirrer, and with an outlet and an inlet for removal and introduction of recycled mixture. The solvent 3 is typically a mixture of alkanol and water, e.g., a mixture of ethanol and water, e.g., an 80:20 v/v mixture of ethanol and water. Scrap material 2 may be waste from carpet or carpet tile, and may be in the form of cut or ground up pieces or crumb, as selvedge, or in larger pieces. The use of ground up crumb is particularly suitable for the process of the invention. In addition, while it is not strictly necessary, it is advantageous to pretreat the crumb by either elutriating it to at least partially separate nylon from other scrap materials, rinsing it to remove non-nylon particulates, or some combination of these. As an example, the crumb can be first elutriated, e.g., by air elutriation, to largely separate nylon from PVC and other materials, and the nylon can be rinsed to remove smaller particles, like PVC or calcium carbonate filler particles.

The mixture of solvent and nylon-containing material 5 (which may include predominantly nylon, or may be a mixture of nylon and insoluble materials, such as carpet backing, plasticizers, etc.), is removed from the mixer through an exit valve and passed to a pump 5a for recycle and processing. This pump can desirably be a centrifugal or other type pump suitable for creating high flow rates, and may also have size reduction capabilities (e.g., a so-called "chopper" or shearing centrifugal pump). The effluent of high flow rate pump 5a is passed through a second stage pump 6, which recycles a portion of its influent back to the mixing apparatus at a flow rate and/or linear velocity similar to that delivered by pump 5a. Another portion the influent is pumped by pump 6 as effluent at a lower flow rate and linear velocity and delivered to the next stage in the process.

The splitter pump 6 is desirably a single or dual rotor auger or screw pump, such as a MOYNO progressing cavity pump, in particular a MOYNO L series pump, that has been modified to have an inlet and an outlet in the suction throat of the pump. High flow rate effluent from pump 5a passes into this inlet. A portion of the influent passes through the progressing cavity portion of the pump 6, and exits the pump through the stator, from where it is piped to the remaining process steps. This portion is supplied at a considerably decreased flow rate and linear velocity from that of the influent. The remaining portion of the influent passes through the throat of pump 6 without passing through the progressive cavity portion of the pump, and exits the pump through an effluent opening opposite the inlet opening in the throat area of the pump. This stream is returned at high flow rate to the mixing vessel as a recycle stream.

One embodiment of a splitter pump 6 suitable for use in the process of this invention is illustrated in FIG. 2. The use of inlet opening 201 in the throat area 205 of the pump, a corresponding outlet opening, also in the throat area of the pump, and process stream outlet opening 203 helps to minimize clogging of the pump resulting from agglomeration of the nylon fibers or particles. In addition, the pump can operate at relatively high pressure and produce a linear velocity sufficiently high to create agitated plug flow of the mixture or suspension in the process stream exiting the stator 209 through outlet 203. As indicated, a significant portion of the pump effluent is recycled back to the mixing vessel. The extensive recycling of the mixture helps to keep the nylon fibers or particles in suspension and limit agglomeration. A portion of the pump effluent is separated from the recycle stream by passage through the stator 209 and out outlet 203, and then passed to the process heat exchange system 10. Opening 207 is used to clean the pump, and is normally kept closed during pump operation.

Figure 2A:
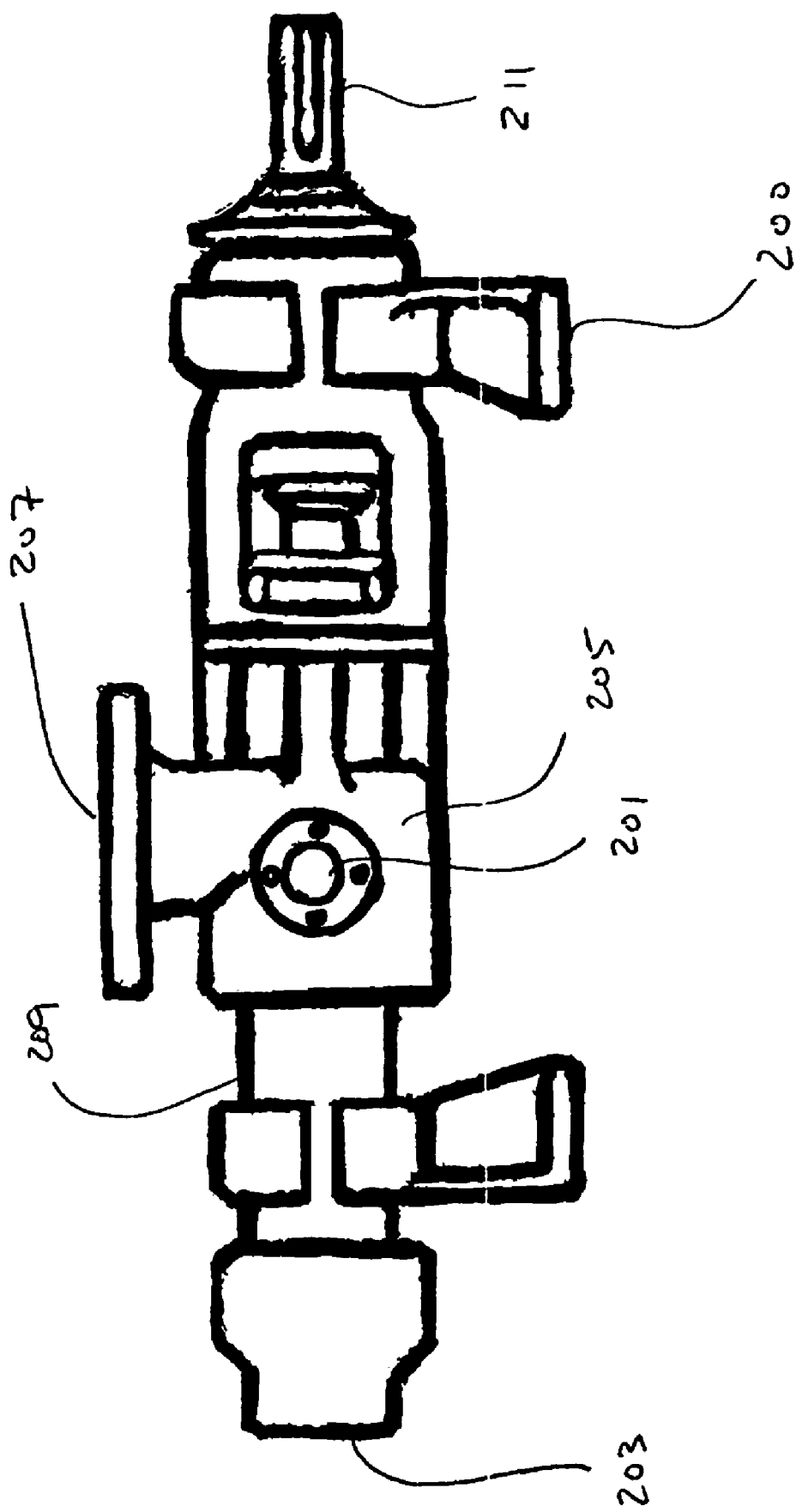
FIG. 2(A) is a left side view of the pump according to the invention.
Figure 2B:
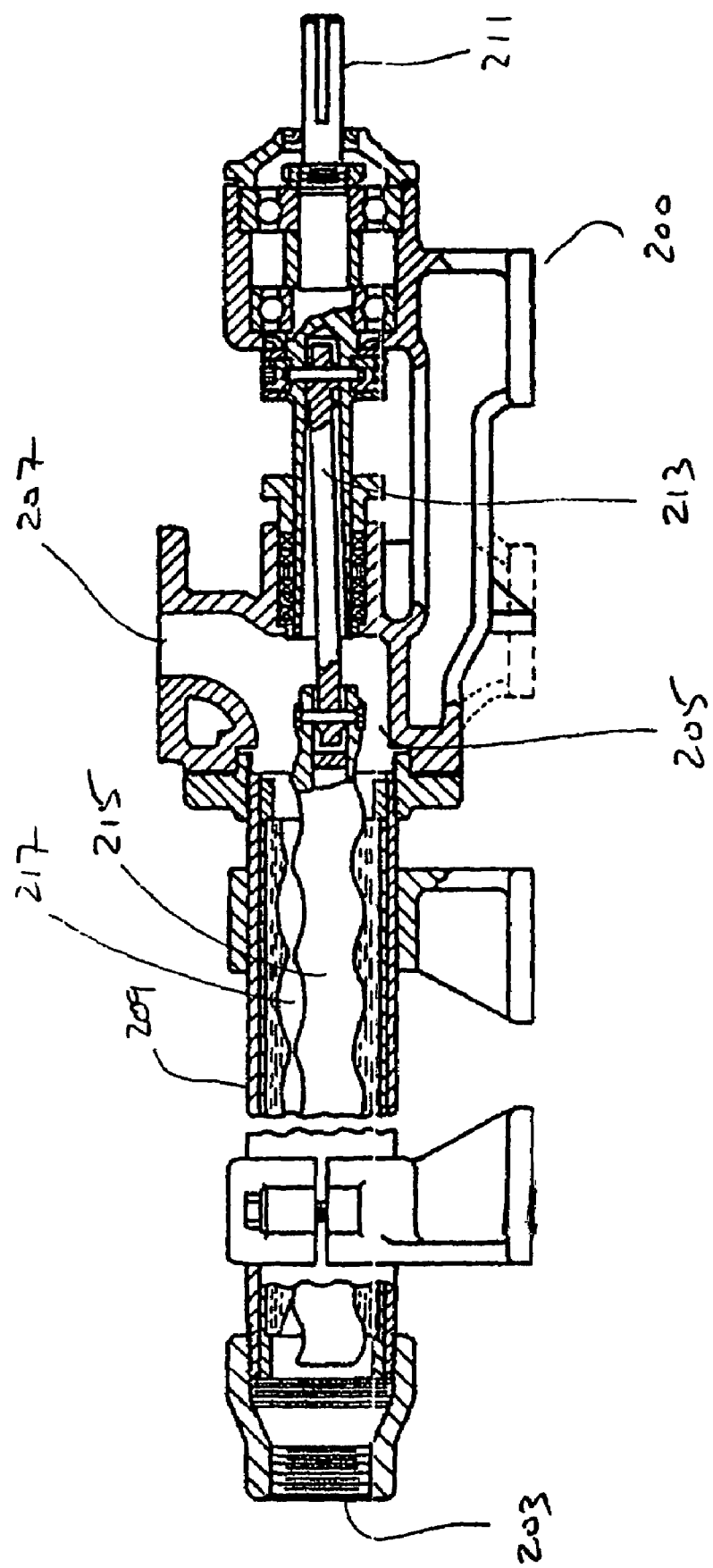
FIG. 2(B) is a left cross-sectional view of the pump shown in FIG. 2(A).

FIG. 2A shows a left side view of the embodiment of splitter pump 6 described above. It will be understood that the right side view is a mirror image of the left side view. The pump is driven by a motor (not shown) coupled to drive shaft 211, which is coupled to a link 213 (in FIG. 2B) extending through the throat area 205 of the pump. This link is coupled to a rotor 215 (FIG. 2B), which creates progressive cavities 217 (FIG. 2B) in conjunction with stator 209. A similar outlet opening opposite inlet 201 allows a portion of the inflowing material to be recycled out of the pump, while a portion is diverted by the rotor/stator combination and leaves the pump by outlet 203. The splitter pump according to this embodiment of the invention can be made by modifying a series L Moyno progressive cavity pump by boring openings on either side of the throat of the pump, as indicated in FIG. 2A, welding appropriate flanges around the openings, and closing the stock opening at the top of the pump.

The heat exchange system 10 can include one or more heat exchangers that permit continuous plug flow of the mixture, while raising its temperature to a dissolution temperature, typically ranging from about 130° C. to about 155° C., more particularly at a temperature from about 135° C. to about 145° C., even more particularly at a temperature from about 140° C. to about 145° C., and at a pressure above the equilibrium vapor pressure of the solvent. Typical pressures range from about 300 psig to about 600 psig, more particularly from about 300 psig to about 400 psig, even more particularly from about 400 psig to about 500 psig. Suitable heat exchangers include stacked heat exchangers or jacketed plug flow reactors, coiled tube heat exchangers, and other exchanger designs that allow plug flow at high pressure. For example, one or more coiled tube exchangers, where the process fluid passes through a smooth tube side and steam passes through the shell side, can be used to heat the process stream to dissolution temperature, particularly in smaller scale processes. A stacked heat exchanger or jacketed plug flow reactor, with steam or other heat transfer fluid flowing through the jacket, can be used, particularly in larger scale processes. An important feature of the heat exchanger is that it does not require that the process stream flow through manifolds, heads, constrictions, expansions, or other flow obstructions that can allow the slurried material to accumulate prior to dissolution of the nylon. Stacked heat exchangers using, e.g., seamless core pipe with a full flow jacket have been found to be particularly suitable in this regard, as they do not cause any significant agglomeration of the dissolving slurry.

Desirably, the residence time in the heat exchanger is sufficiently long to allow most or all of the suspended nylon to dissolve. Residence time may vary, depending on other parameters, such as the amount of solids in the mixture, flow rate, dissolution temperature, pressure, and the like, but typically is at least about 60 s, more particularly at least about 180 s, for 2% nylon solids. Minimum residence time will increase with increasing solids loading.

Any particulate material remaining after dissolution can be removed from the process stream by a filtration system 14, desirably containing one or more filters and strainers. For example, a preliminary filter may be used to remove larger particles, e.g., those above 100 µm, followed by a finer filter to remove smaller particles, e.g., those of around 1 µm. If necessary for efficient filtration, the process stream can be split and passed through two or more banks of filters.

The hot, pressurized, filtered process stream 15 is then passed to a precipitator 16 to precipitate nylon from solution. The precipitator may be a simple flash tank, wherein the lower pressure in the flash tank causes dissolved nylon to precipitate. Alternatively, more complex precipitators, such as force circulation evaporative crystallizers, magma crystallizers, draft tube baffle crystallizers, surface cooled crystallizers, and the like, can be used to obtain precipitated nylon. Precipitator 16 may be in fluid communication with optional recycle streams 18 and 20, and with recycle pump 19. A recycle stream of precipate and mother liquor can be recycled back to the precipitator, in an amount sufficient to keep a substantial portion of the solids suspended in the solvent mixture and prevent settling. The process stream 17 leaving the precipitator generally contains a suspension of precipitated nylon in solvent, and the nylon and mother liquor are separated by filtration system 22. Filtration system 22 may be any suitable filtration system; however, it has been found that a reverse osmosis or membrane filtration system provides good results. In particular, a vibratory shear enhanced processing system (VSEP), such as that produced by New Logic Research, Inc., is particularly suitable for efficiently separating precipitated particulate nylon from the precipitation mother liquor. However, a filter press may be used in place of, or as an adjunct to, the VSEP system to provide a higher solids content nylon slurry more suitable for conventional filtration and/or drying to nylon.

In one embodiment of the invention the precipitated nylon particles are washed with water or other aqueous washing solution and dried. In the illustrated embodiment, a portion of the particles 27 are washed in washer 24 with water 25, and the resulting suspension 26 is recycled by pump 29 to the filtration system 22 for reconcentration, after which the reconcentrated particles 30 are dried in drier 31, producing dried nylon product 32.

Drier 31 may be one or more of a variety of types of driers available, depending upon the level of solids content of the precipitated nylon slurry obtained from the filtration process. The driers desirably operate under vacuum or in an inert gas environment, as described above. A VSEP system can typically concentrate the product stream to a solids content of about 5-6%, which is too low for efficient operation of many commercially available driers. Addition of (or replacement by) a filter press can increase the solids content to 25% or higher. At solids contents higher than about 10%, a spin flash drier or a paddle type drier can be efficiently used. With a 10% solids content feedstock, a spin flash dryer (APV) can provide a dried product with a volatiles content as low as about 1.5% or lower. Volatiles concentrations as low as 0.07% have been obtained using a paddle drier (Littleford Day) containing agitating plows and choppers.

As explained above, the process of the invention uses recycle streams in solvent mixing and crystallization, uses specialized pumping equipment, and avoids sharp internal edges and turns in process equipment and piping, to reduce fouling of process equipment. In addition, it has been found that, unexpectedly, some solvents, such as alkanol solvents, can be taken up in significant quantities by the nylon fibers or particles in the feedstock during or subsequent to the mixing process. As a result, it is desirable to use a relatively high weight ratio of solvent to waste feedstocks, generally in the range of about 90 wt % to about 99 wt %, based on the total weight of feedstock solution/suspension. The use of a relatively dilute slurry of nylon allows the slurry to be more easily pumped throughout the process.

The invention can be more clearly understood by reference to the following Examples, which are not intended to limit the scope of the invention in any way.

EXAMPLE 1

A series of tests were conducted wherein nylon yarn or nylon chips were tested to determine a baseline relative viscosity. Nylon chips were also dissolved in a methanol/water mixture, the nylon recovered, and its relative viscosity measured. A number of nylon-containing carpet tiles (designated as Sample Nos. 1-6) were chopped up and placed into a pressure vessel to which 400 ml of an alkanol solvent and 100 ml water were added as indicated below, and the mixture heated and pressurized as indicated below. The solution was removed from the pressure vessel into another vessel, where it was cooled until nylon precipitated. This nylon was then tested for relative viscosity using the same method that was used for the nylon yarn or chips. The results are indicated below in Table 1.

TABLE 1

| Samples | Digestion Temp., °C. | Solvent (80% Concentration) | Final Pressure, psig | Relative Viscosity |
|---|---|---|---|---|
| Nylon 6,6 Yarn | Not digested | NA | NA | 44 |
| Standard PA 66 | Not digested | NA | NA | 45 |
| Standard PA 66 | 165 | Methanol | 205 | 34 |
| 1 | 165 | 99% Isopropanol | 140 | 40 |
| 2 | 165 | Denatured Ethanol | 400 | 37 |
| 3 | 175 | Denatured Ethanol | 150 | 34 |
| 4 | 165 | Pure Ethanol | 150 | 42 |
| 5 | 155 | Denatured Ethanol | 400 | 44 |
| 6 | 155 | Pure Ethanol | 450 | 48 |
| 7 | 150 | Pure Ethanol | 400 | 45 |
| 8 | 145 | Pure Ethanol | 400 | |

EXAMPLE 2

A similar procedure to that used in Example 1 was followed, using two samples from the same carpet tile or broadloom carpet, and varying the pressure thereof. The results are reported below in Table 2. Where "Methanol" and "Pure Ethanol" are indicated 400 ml. of these solvents were mixed with 100 ml of water ("Pure Ethanol" indicates merely that the ethanol has not been denatured). Where "100% Methanol" is indicated, water was not included in the mixture. Samples 1 and 3 were taken from carpet tile, Sample 2 was taken from broadloom carpet, and Sample 4 was taken from hotmelt precoated carpet.

TABLE 2

| Samples | Digestion Temp., °C. | Solvent | Final Pressure, psig | Viscosity Number | Relative Viscosity |
|---|---|---|---|---|---|
| Nylon 6, 6 Yarn | Not Digested | NA | NA | 135 | 44 |
| Standard PA 66 | Not Digested | NA | NA | 137 | 45 |
| Standard PA 66 | 165 | Methanol | 205 | 112 | 34 |
| 1A | 155 | 100% Methanol | 210 | 141 | 47 |
| 1B | 155 | Pure Ethanol | 150 | 141 | 47 |
| 2A | 155 | 100% Methanol | 210 | 162 | 60 |
| 2B | 155 | Pure Ethanol | 150 | 166 | 62 |

EXAMPLE 3

An 80% mixture of ethanol and water was preheated to the temperatures indicated below, and added all at once to a vessel containing nylon fiber in sufficient amount to provide a 3.5 wt % mixture of solvent and nylon. The mixture was pressurized to the pressure indicated below in Table 3, and held at pressure for the time indicated below. The liquid was removed from the vessel and cooled in a jacketed vessel to a temperature of 120° C. The resulting cooled liquid was filtered to removed precipitated nylon. The undissolved nylon remaining in the first vessel was measured, and a yield of dissolved nylon to total nylon added to the mixture was computed.

TABLE 3

| Run | Temperature (°C.) | Pressure (psig) | Time (min.) | Yield (%) |
|---|---|---|---|---|
| 1 | 143 | 300 | 37 | 64 |
| 2 | 143 | 400 | 23 | 82 |
| 3 | 147 | 450 | 23 | 100 |
| 4 | 150 | 500 | 15 | 100 |
| 5 | 160 | 150 | 45 | 88 |

EXAMPLE 4

Feedstock material obtained by shearing, vacuum collecting, bagging, and baling nylon 6,6 broadloom carpet waste was processed through the apparatus shown in FIG. 1. 10 strands of nylon feedstock fiber were sampled and analyzed to be nylon 6,6. The feedstock nylon fiber was mixed with ethanol to a concentration of 2.75 wt %, based on the total weight of feedstock solution, in mixer 1, pressurized to between 425 and 460 psi. Heating in heat exchanger 10 (a coiled-tube heat exchanger) raised the slurry temperature to between 138 and 143° C. A flow rate through the heat exchanger of between 1.32 and 1.5 gpm was used. The solution was strained and precipitated in a crystallizer tank at a temperature ranging from about 115 to 125° C. The suspended nylon in solution is then passed to a first filtration/concentration system (i.e., a VSEP) to concentrate the solution to 5% to 6% by weight solids content. Dried solids obtained from previous runs were backmixed to a solids content of 10-15% to allow more efficient operation of the dryer (the process was later modified to add a filter press following the VSEP operation to eliminate the need for backmixing). Although this meant that some of the solids passed through the dryer multiple times, the results were quite good. This material was filtered again with a 100 micron filter.

100 lbs of the nylon powder obtained from the process was further dried and pelletized, to obtain material having a 500 ppm moisture content, and relatively uniform particle size. Approximately 70 lbs of this pelletized material was extruded through a filter pack (at a back pressure of about 500 psig) and a spinnerette during the course of 2-3 hours to obtain nylon fiber. The denier and tenacity of the yarn obtained by this process were tested and reported below in Table 4:

TABLE 4

| DENIER | TENACITY |
|---|---|
| 2429 | 3.11 lb |

The fiber was spun into yarn, which was then incorporated into carpet having a face weight of 17 oz/yd$^2$. No other fiber was used in the yarn to make the carpet face cloth. The yarn was tufted into Lutradur primary backing with a Glasbac backing.

Various tests were performed on the carpet obtained by this process, the results of which are summarized below in Table 5.

TABLE 5

| TEST | RESULT |
|---|---|
| Art 5 yr (Dry) Maintenance | 8.25 |
| Art 5 yr (Wet) Maintenance | 8 |
| Burrough's Resistance | 9083 meg |
| Delamination - Dry | No separation |
| Fluorine | 2322 |
| IBM Resistance | 3783 meg |
| Light Fastness | 2-3 (60 AFUs) |
| Nitrogen Dioxide | 4-5 (2 cy.) |
| Ozone Fading | 4-5 (2 cy.) |
| Radiant Panel | .70 |
| Radiant Panel - 15 min. | .78 |
| Smoke - Flaming | 166 |
| Smoke - Flaming - 4 min. | 131 |
| Smoke - Non-flaming | 438 |
| Smoke - Non-flaming - 4 min. | 66 |
| Stain (red dye 40) - 24 hour | 10 |
| Tuftbind - Dry | 8.66 lb |
| Vetterman Drum | 1.5 @ 22,000 cy. |

In addition, the molecular weight of the shear waste feedstock material and the dried nylon obtained from the process, and pelletized nylon prior to fiber extrusion were measured as viscosity averaged molecular weight. Feedstock molecular weight was determined to be about 30 kdaltons. 6 samples of nylon, obtained from the above described process and further dried in either an APV spin flash dryer or a Littleford Day vacuum dryer, averaged about 38 kdaltons in molecular weight. The molecular weight of the pelletized nylon was determined to be approximately 40 kdaltons.

EXAMPLE 5

Nylon 6,6 obtained from the pressurized dissolution of carpet shear waste described above was combined with virgin nylon in different weight ratios, extruded into undrawn and drawn fiber, and evaluated for tenacity and elongation. The same evaluation was performed on completely virgin nylon fiber. The results for average tenacity and elongation are provided in Table 6 below.

TABLE 6

| SAMPLE NO. | CONTENT RECYCLED:VIRGIN | TENACITY UNDRAWN | ELONG. UNDRAWN | TENACITY DRAWN | ELONG. UNDRAWN |
|---|---|---|---|---|---|
| 1 | 25:75 | 1.03 | 437.90 | 3.56 | 19.75 |
| 2 | 50:50 | 1.01 | 411.02 | 3.58 | 20.33 |
| 3 | 100:0 | 1.04 | 370.74 | 3.89 | 19.88 |
| Control | 0:100 | 0.937 | 408.87 | 2.7-3.2 (spec.) | |

The data shows that, surprisingly, tenacity for fibers containing recycled nylon obtained by the process of this invention is better than the tenacity obtained for virgin undrawn nylon fiber, and well above the industry specifications for drawn nylon fiber. Moreover, as the recycled content of the fiber increases, the tenacity surprisingly improves further.

This description of specific embodiments of the invention is intended to enable those of skill in the art to more easily understand the nature of the invention, but not to limit the scope of the appended claims or the range of equivalents thereof.

What is claimed is:

1. A method for recovering nylon from a nylon-containing material, comprising:

contacting the nylon-containing material with an alkanol-containing solvent in a mixing vessel, wherein at least a portion of the mixture of nylon-containing material and alkanol-containing solvent is withdrawn from the mixing vessel and returned to the mixing vessel at a high flow rate;

increasing the temperature and pressure of the mixture until a pressure is reached that is higher than the equilibrium pressure of the alkanol-containing solvent, and until the temperature is between 130° C. and 155° C. thereby dissolving the nylon in the alkanol-containing solvent;

removing the alkanol-containing solvent containing dissolved nylon from any undissolved solids; and decreasing the temperature, or pressure, or both, of the alkanol-containing solvent containing dissolved nylon to precipitate the dissolved nylon.

2. The method of claim 1, wherein the temperature of mixture is increased in a plug flow heat exchanger.

3. The method of claim 2, wherein the plug flow heat exchanger comprises a coiled tube heat exchanger.

4. The method of claim 2 wherein the plug flow heat exchanger comprises a stacked single pass jacketed heat exchanger.

5. The method of claim 1, further comprising concentrating, dewatering, or otherwise increasing the percent solids concentration of the precipitated nylon.

6. The method of claim 5, wherein the concentrating, dewatering or otherwise increasing the concentration of the precipitated nylon comprises subjecting the precipitated nylon containing stream to vibratory shear enhanced processing membrane filtration.

7. The method of claim 5, wherein the concentrating, dewatering or otherwise increasing the concentration of the precipitated nylon comprises subjecting the precipitated nylon containing stream to a filter press.

8. The method of claim 5, wherein the concentrating, dewatering or otherwise increasing the concentration of the precipitated nylon comprises subjecting the precipitated nylon containing stream to vibratory shear enhanced processing membrane filtration, and a filter press.

9. The method of claim 5, wherein concentrating, dewatering or otherwise increasing the concentration of the precipitated nylon increases the solids content of the precipitated nylon in the liquid to at least 5%.

10. The method of claim 9, wherein the solids content is increased to 5-10%.

11. The method of claim 9, wherein the solids content is increased to at least 25%.

12. The method of claim 9, further comprising drying the dewatered, concentrated precipitated nylon in a drier operating under a vacuum or in an inert gas environment.

13. The method of claim 12, wherein the drying occurs in a spin flash drier.

14. The method of claim 12, wherein the drying occurs in a paddle drier comprising agitating plows and choppers.

15. The method of claim 1, wherein the mixing comprises withdrawing a portion of the mixer contents through a conduit by a splitter pump, diverting a portion of the withdrawn material to further processing, and returning the remainder of the withdrawn portion to the mixer.

16. The method of claim 1, wherein the alkanol-containing solvent comprises an alkanol selected from the group consisting of methanol, ethanol, propanols, butanols, and mixtures thereof.

17. The method of claim 1, wherein the alkanol-containing solvent comprises a mixture of alkanol and water.

18. The method of claim 17, wherein the alkanol is present in an amount ranging from about 40 wt % to about 90 wt % of the solvent.

19. The method of claim 18, wherein the alkanol-containing solvent comprises a mixture of about 80 wt % ethanol in water.

20. The method of claim 1, wherein the pressure during the contacting ranges from about 300 psig to about 500 psig.

21. The method of claim 1, wherein the elevated temperature is about 140° C.

22. The method of claim 1, wherein the pressure higher than the equilibrium pressure of the alkanol-containing solvent at the elevated temperature is attained by introducing an inert gas into the system.

23. The method of claim 1, wherein the pressure higher than the equilibrium pressure of the alkanol-containing solvent at the elevated temperature results at least in part from the pressure head of the alkanol-containing solvent in the system.

24. The method of claim 1, wherein the nylon-containing waste material comprises nylon-containing floor covering materials.

25. The method of claim 24, wherein the nylon-containing floor covering materials comprise carpet or carpet tile, or mixtures thereof.

26. The method of claim 25, wherein the carpet or carpet tile contains nylon 6,6.

27. A method for recovering nylon from a nylon-containing material, comprising:
    contacting the nylon-containing material with an alkanol-containing solvent in a mixing vessel, wherein at least a portion of the mixture of nylon-containing material and alkanol-containing solvent is withdrawn from the mixing vessel by a splitter pump and returned to the mixing vessel at a high flow rate;
    increasing the temperature and pressure of the mixture until a pressure is reached that is higher than the equilibrium pressure of the alkanol-containing solvent, and until the temperature is between 130° C. and 155° C. thereby dissolving the nylon in the alkanol-containing solvent;
    removing the alkanol-containing solvent containing dissolved nylon from any undissolved solids;
    decreasing the temperature, or pressure, or both, of the alkanol-containing solvent containing dissolved nylon to precipitate the dissolved nylon;
    concentrating, dewatering, or otherwise increasing the concentration of the precipitated nylon;
    drying the dewatered, concentrated precipitated nylon in a drier.

28. A method for increasing the tenacity of nylon fiber, comprising:
    dissolving a feedstock nylon fiber in a solvent comprising an alkanol at an elevated temperature between 130° C. and 155° C. and at a dissolution pressure above the equilibrium vapor pressure of the solvent at the dissolution temperature;
    filtering undissolved solids from the solution;
    precipitating nylon from solution by decreasing pressure, temperature, or both of the solution, to form a precipitated mixture;
    concentrating the precipitated nylon by removing solvent from the precipitated mixture to form a concentrated mixture;
    drying the concentrated mixture to form solid nylon;
    extruding the solid nylon into fiber having tenacity increased over that of the feedstock nylon fiber.

29. A method for increasing the molecular weight of feedstock nylon, comprising:
    dissolving a feedstock nylon in a solvent comprising an alkanol at an elevated temperature between 130° C. and 155° C. at a dissolution pressure above the equilibrium vapor pressure of the solvent at the dissolution temperature;
    filtering undissolved solids from the solution;
    precipitating nylon from solution by decreasing pressure, temperature, or both of the solution, to form a precipitated mixture;
    concentrating the precipitated nylon by removing solvent from the precipitated mixture to form a concentrated mixture;
    drying the concentrated mixture to form solid nylon having a molecular weight substantially increased over that of the feedstock nylon.

30. The method of claim 29, wherein the molecular weight of the solid nylon is at least 8 kdalton higher than that of the feedstock nylon.

31. The method of claim 30, wherein the molecular weight of the solid nylon is at least 10 kdalton higher than that of the feedstock nylon.

* * * * *